(12) United States Patent
Ravid et al.

(10) Patent No.: US 7,883,135 B2
(45) Date of Patent: Feb. 8, 2011

(54) ENERGY ABSORBING DEVICE FOR A VEHICLE SEAT

(75) Inventors: Moshe Ravid, Hod Hasharon (IL); Shlomo Birger, Nazrat Elit (IL)

(73) Assignee: Plasan Sasa Ltd., M.P. Marom Hagalil (IL)

( * ) Notice: Subject to any disclaimer, the term of this patent is extended or adjusted under 35 U.S.C. 154(b) by 790 days.

(21) Appl. No.: 11/808,135

(22) Filed: Jun. 6, 2007

(65) Prior Publication Data

US 2008/0122243 A1 May 29, 2008

Related U.S. Application Data

(63) Continuation-in-part of application No. 11/081,831, filed on Mar. 17, 2005, now Pat. No. 7,393,039.

(30) Foreign Application Priority Data

Mar. 18, 2004 (IL) .................. 160939

(51) Int. Cl.
  *B60N 2/02* (2006.01)
  *F41H 7/02* (2006.01)
(52) U.S. Cl. .............. 296/68.1; 297/216.1; 280/751; 89/36.08
(58) Field of Classification Search ........... 296/68.1, 296/187.03, 187.05; 293/102, 132, 133, 293/135, 136, 137; 188/377; 297/216.1, 297/216.17; 89/36.08; 280/751
See application file for complete search history.

(56) References Cited

U.S. PATENT DOCUMENTS

| 3,323,764 A | 6/1967 | Johnson |
| 3,606,452 A | 9/1971 | Riffe et al. |
| 4,204,659 A | 5/1980 | Phillips et al. |
| 4,336,868 A | 6/1982 | Wilson et al. |
| 4,711,424 A | 12/1987 | Neubert et al. |
| 4,934,749 A * | 6/1990 | Folarin .................. 293/134 |
| 5,035,307 A | 7/1991 | Sadeghi et al. |
| 5,758,859 A | 6/1998 | Gonzalez |
| 5,813,649 A | 9/1998 | Peterson et al. |
| H1833 H | 2/2000 | Hoppel et al. |

(Continued)

FOREIGN PATENT DOCUMENTS

DE  40 11 963 A1  10/1990

(Continued)

*Primary Examiner*—Joseph D Pape
(74) *Attorney, Agent, or Firm*—The Nath Law Group; Susanne M. Hopkins; Ari G. Zytcer

(57) ABSTRACT

An energy absorbing device is provided for reducing acceleration resulting from a force of a high energy impact acting on one side of the device in an impact direction. The device includes two plates transverse to the impact direction, an energy absorbing mechanism between the plates, and a stabilizing mechanism having at least one pair of a projecting element and a receiving element, the projecting element comprised on one plate and a corresponding receiving element comprised on the other plate. Each pair is adapted for enabling the projecting element thereof to be at least partially received by the corresponding the receiving element in a manner to restrict relative displacement between the two plates at least in one direction different from the impact direction and to allow substantially free relative displacement between the plates in the impact direction.

52 Claims, 9 Drawing Sheets

U.S. PATENT DOCUMENTS

| | | | |
|---|---|---|---|
| 6,520,541 | B1 | 2/2003 | Cantor |
| 6,698,331 | B1 | 3/2004 | Yu et al. |
| 2003/0160480 | A1 | 8/2003 | Allera et al. |

FOREIGN PATENT DOCUMENTS

| | | |
|---|---|---|
| DE | 422 22 22 | 1/1994 |
| DE | 101 30 632 | 1/2003 |
| DE | 10 2004 054 962 A1 | 5/2006 |
| EP | 0 943 490 A | 9/1999 |
| GB | 1 228 657 A | 4/1971 |
| WO | 92/06003 A1 | 4/1992 |
| WO | 93/01950 A2 | 2/1993 |

\* cited by examiner

ENERGY ABSORBING DEVICE FOR A VEHICLE SEAT

This is a Continuation-In-Part of U.S. patent application Ser. No. 11/081,831 filed Mar. 17, 2005, now U.S. Pat. No. 7,393,039 and claims priority from Israeli Patent Application no. 160939 filed Mar. 18, 2004, the contents of which are hereby incorporated by reference in their entirety.

FIELD OF THE INVENTION

This invention relates to devices for, and methods of, absorbing energy of a high energy impact such as associated with an explosion, e.g. a mine blast, or crash situations, by attenuating forces generated by the impact. The invention particularly refers to the use of such devices and methods in a vehicle for the reduction of amount of acceleration transmitted to a seated occupant in the vehicle as a result of an explosion or sudden impact.

BACKGROUND OF THE INVENTION

Force attenuation devices of the above kind are used, for example, in military vehicles such as tanks, jeeps, airplanes, helicopters or the like, which have a floor and a seat, where the devices are mounted between the floor and the seat. The devices often include elements which, under high energy impact, undergo permanent deformation or crushing. Such elements are often made of a metal material or of a material capable of progressive deformation such as a composite fibrous material.

U.S. Pat. No. 4,336,868 and U.S. Pat. No. 5,035,307 are two examples of publications disclosing devices of the above kind. U.S. Pat. No. 4,336,868 discloses an apparatus for the attenuation of high velocity impact landing forces, utilizing an energy absorbing tube made of composite fibrous material, which is progressively crushed by a force applying structure, to dissipate energy. U.S. Pat. No. 5,035,307 discloses an energy absorbing device designed for similar purposes, which also uses an energy absorbing tube comprising fiber reinforced plastics material.

US Statutory Invention Registration No. H1,833 discloses the use of a plurality of crushable or foldable tube elements made of a composite, to reduce the amount of force and acceleration transmitted to a seated occupant in a military vehicle, subject to the shock of a land mine explosion. The tubes are placed between the vehicle floor and the seat so that, as the floor moves due the blast loading, the crushable tubes will progressively deform, or the foldable tubes will progressively fold, absorbing the energy of the blast and reducing the acceleration transmitted to the seated occupant. In one embodiment disclosed in H1,833 the tubes are aligned concentrically and one of them is higher than the other, for the higher tube to be loaded before the lower tube, whereby the deformation rate can be controlled such that, if one of the tubes fails to absorb the required energy, the other tube becomes more stiff as it deforms, thus absorbing the required energy.

It has also been suggested to use energy absorbing elements in non-military vehicle safety seat systems. For example, U.S. Pat. No. 6,520,541 and US 2003/0160480 disclose the use of progressive deformation elements made of aluminum foam, which is known to be rate sensitive, i.e. to be easier compressible when force is applied to it more slowly.

SUMMARY OF THE INVENTION

The present invention relates to an energy absorbing device for reducing acceleration resulting from a force of a high energy impact acting on one side of said device in an impact direction, the device comprising a first plate at said one side, a second plate at the other side thereof, both plates being transverse to said impact direction, and an energy absorbing mechanism extending between the plates, wherein said device further comprises a stabilizing mechanism comprising at least one pair of a projecting element and a receiving element, said projecting element comprised on one of said first plate and second plate and a corresponding receiving element comprised on the other one of said first plate and said second plate, wherein the or each said pair being adapted for enabling the projecting element thereof to be at least partially received by the corresponding said receiving element in a manner to restrict relative displacement or movement between said first plate and said second plate at least in one direction different from said impact direction and to allow substantially free displacement of said first plate relative to said second plate in said impact direction.

In one embodiment of the invention, the said at least one pair of a projecting element and a receiving element comprises a first peripheral wall and a second peripheral wall comprised on said first plate and said second plate, respectively, one of said first or second peripheral wall adapted for being at least partially nested within the other one of said first or second peripheral wall in a manner to restrict displacement of said first plate relative to said second plate at least in one direction different from said impact direction and to allow substantially free relative displacement in said impact direction.

Optionally, said first and second peripheral walls depend from peripheral edges of said first and second plates, respectively, in directions toward the other said first and second plates, respectively. Alternatively, at least one said first peripheral wall and said second peripheral wall may depend from a corresponding base plate to form an open box structure, and wherein the or each said base plate is joined to a corresponding at least one of said first plate and said second plate.

In this embodiment, the said first peripheral wall and said second peripheral wall are separated from one another at least in one direction different from said impact direction by a substantially continuous spacing. Optionally, a suitable friction reducing material, for example TEFLON® (polytetrafluoroethylene) or the like, may be provided in said spacing to reduce resistance to mutual movement between said first and second peripheral walls parallel to said impact direction.

Optionally, said at least one of said first peripheral wall and said second peripheral wall comprises one or a plurality of through holes. Further optionally, said at least one of said first peripheral wall and said second peripheral wall comprises one or a plurality of slits extending to a free end of corresponding said first peripheral wall or said second peripheral wall. Further optionally, the device may further comprise a suitable friction reducing material, for example TEFLON® or the like, on at least one mutually facing surface of said first peripheral wall or said second peripheral wall to reduce resistance to movement between said first and second peripheral walls along said impact direction.

Optionally, said first peripheral wall and said second peripheral wall each have a form corresponding to an open parallelepiped when joined to said first plate and second plate, respectively. Optionally, said first peripheral wall and said second peripheral wall each have a form corresponding to an open cuboid when joined to said first plate and second plate, respectively. Optionally, said first peripheral wall is substantially unconnected to said second peripheral wall when at least partially nested one in the other.

Optionally, said stabilizing mechanism is adapted to restrict said displacement opposite to said impact direction. In one embodiment, said device comprises a stop arrangement to limit minimum nesting overlap between said first peripheral wall and said second peripheral wall. The said stop arrangement may be configured for substantially preventing relative movement between said first plate and said second plate in a direction away from one another. Optionally, the said stop arrangement comprises a spaced plurality of pins, each pin joined to one of said first peripheral wall and said second peripheral wall and passing through a slit formed in the other one of said first peripheral wall and said second peripheral wall, wherein said slit is substantially aligned along said impact direction.

Optionally, the said stabilizing mechanism is adapted to restrict said displacement in a direction perpendicular to said impact direction. Optionally, said stabilizing mechanism is adapted to restrict rotational displacement of said first plate about an axis parallel to said impact direction. Optionally, said stabilizing mechanism is adapted to restrict said displacement in any direction different from said impact direction.

A feature of the stabilizing mechanism is that it provides for relatively simple construction and assembly.

According to one aspect of the invention, the said device is adapted for use in a vehicle, the first plate being under the seat of an occupant of the vehicle and the second plate being directly or indirectly attached to the floor of the vehicle.

In one embodiment of the invention, said energy absorbing mechanism comprises a first energy absorbing mechanism having a first dimension in the impact direction and capable of undergoing elastic deformation of a predetermined amount in the impact direction; and a second energy absorbing mechanism having a second dimension in the impact direction, which is smaller than the first dimension to a distance corresponding to said amount of elastic deformation, thereby allowing the second mechanism to be loaded with said force after the first mechanism has undergone said elastic deformation, said second mechanism comprising a material capable of progressive deformation. Optionally, the first mechanism is made of a material capable of undergoing plastic deformation simultaneously with said progressive deformation.

According to one aspect of the invention, the device is capable of reduction of the acceleration transmitted to a seated occupant of a vehicle to a level not exceeding 18 g for a constrained seated occupant during 30 μsec, with the deformation of the device in the impact direction not exceeding 100 mm.

According to an aspect of the invention, said first plate may be adapted to be attached directly or indirectly to a floor of a vehicle, said second plate is adapted to be attached directly or indirectly to a vehicle seat, said first energy absorbing mechanism extending between the first and second plates with its two ends attached to the plates, and the second energy absorbing mechanism attached to the first plate with its one end and having the other end spaced from the first plate to said distance corresponding to said amount of elastic deformation of the first element. Optionally, the first mechanism is in the form of a plurality of peripherally located spaced apart first energy absorbing elements surrounding a centrally disposed second energy absorbing mechanism. Further optionally, the first energy absorbing elements are spaced from the second energy absorbing mechanism so that, when they are deformed, they do not contact the second mechanism. Further optionally, the first mechanism has special deformation area or areas, about which its deformation takes place. Further optionally, the second energy absorbing mechanism is in the form of at least one solid second energy absorbing element capable of progressive deformation. Further optionally, the second mechanism is at least partially made of metal foam, for example aluminum foam.

Optionally, said second energy absorbing mechanism is provided with a resilient spacer adapted to damp forces that may be exerted on the first plate of the device. Further optionally, the second mechanism is provided with a resilient pad at an upper end of the mechanism, whose dimension in the impact direction equals said amount of elastic deformation.

According to an aspect of the invention, said energy absorbing mechanism comprises first peripherally disposed energy absorbing elements spaced apart from each other, having a first dimension in the impact direction and capable of undergoing elastic deformation of a predetermined amount in the impact direction; and a second centrally disposed energy absorption element having a second dimension in the impact direction, which is smaller than the first dimension to a distance corresponding to said amount of elastic deformation, thereby allowing the second element to be loaded with said force after the first elements have undergone said elastic deformation.

According to an aspect of the invention, the device may further comprise a shear pin arrangement for substantially immobilizing the said stabilizing mechanism when subjected to a force in said impact direction less than a predetermined force. Optionally, said predetermined force may be substantially less than that provided by an explosive device rated for the device. Optionally, said predetermined force is substantially more than that induced by predetermined driving conditions.

The present invention also relates to a seat structure comprising an energy absorbing device according to the invention, and to a vehicle comprising such a seat structure.

The present invention also relates to a method of energy absorbing employed in an energy absorbing device according to the invention.

In accordance with other aspects of the present invention, there is provided an energy absorbing device for reducing acceleration transmitted to a seated occupant in a vehicle as a result of a force of a high energy impact acting thereon in an impact direction, the device comprising a first energy absorbing mechanism having a first dimension in the impact direction and capable of undergoing elastic deformation of a predetermined amount in the impact direction; and a second energy absorbing mechanism having a second dimension in the impact direction, which is smaller than the first dimension to a distance corresponding to said amount of elastic deformation, thereby allowing the second mechanism to be loaded with said force after the first mechanism has at least partially undergone said elastic deformation, said second mechanism preferably comprising a material capable of progressive deformation.

The predetermined amount of elastic deformation may be equal or less than the maximal available amount of such deformation in the material from which the first mechanism is made.

By progressive deformation of the second mechanism, a deformation is meant which, contrary to regular plastic deformation, does not lead to simultaneous crushing of the entire mechanism, but rather successively compresses it, such that uncompressed portions of the mechanism maintain their integrity until they are compressed.

Due to the design of the energy absorbing device according to the present invention, it may be ensured that when the device is subjected to a high energy impact, the impact's energy will start to be absorbed in the process of the elastic deformation of the first energy absorbing mechanism, and the energy absorption will be subsequently continued, at least in part, in the process of progressive deformation of the second energy absorbing mechanism. Preferably, the latter process takes place simultaneously with plastic deformation of the first energy absorbing mechanism succeeding its elastic deformation. The device according to the present invention is thus capable of reduction of the acceleration transmitted to a seated occupant of a vehicle to a level not exceeding an acceptable level of acceleration for a constrained seated occupant during predetermined amount of time.

The device of the present invention is particularly useful to absorb energy of an impact whose direction is normal to a vehicle's floor. The device is thus adapted for mounting between the floor and the seat, and it comprises a lower plate to be attached to the floor, an upper plate to be attached to the seat, said first energy absorbing mechanism extending between the plates with its two ends attached to the plates, and the second energy absorbing mechanism is attached to the lower plate with its one end and having the other end spaced from the upper plate to the distance corresponding to said amount of elastic deformation of the first energy absorbing mechanism.

The first energy absorbing mechanism may be in the form a plurality of peripherally located spaced apart first energy absorbing elements surrounding a centrally disposed second energy absorbing mechanism. The first energy absorbing elements are preferably spaced from the second energy absorbing mechanism so that, when they are deformed, they do not contact the second mechanism.

Each of the first energy absorbing elements may be designed to have special deformation area or areas, about which their elastic and plastic deformation takes place. For example, the first elements may be thin panels, made of a material capable of the required elastic deformation, attached with their ends to the upper and lower plates of the device adjacent two opposite edges thereof, and bent in the middle. There may be two or more of such elements, provided that they are spaced from each other so that their total length along the edges of each of the upper and lower is smaller than the perimeter of the plates. It is desirable that the elements be disposed symmetrically with respect to the impact direction. The elements may be located along each edge of the upper and lower plate or they may be located only along one pair of opposite edges.

The first energy absorbing elements in fact function as legs of the seat, and they therefore should be designed so as to be strong enough to withstand, when the vehicle is in its normal use, during the life time of the vehicle, loads exerted thereon by the weight of a seated occupant and the weight of the seat, while allowing relatively small normal repeated elastic movements of the seat and heavier loads, caused for example by the use of the vehicle under off-road conditions, and to be capable of the required greater elastic deformation under a high energy impact.

The second energy absorbing mechanism may be in the form of at least one solid second energy absorbing element capable of progressive deformation. The cross-sectional area of the second mechanism is preferably 4-10% of the area of each of the upper and lower plates, the latter area corresponding to the area of the seat. The second absorbing element may be made of layers of one material or different materials and/or it may have a varying cross-section, to control the process of its progressive deformation.

The second energy absorbing element is preferably provided with a relatively thin and relatively hard resilient spacer located between the second element and the lower plate, adapted to damp forces that may be exerted from below the vehicle on the second element during continuous normal use of the vehicle, and thereby to protect the second element from being destroyed at the place of its contact with the lower plate, as a result of such forces. The second element may also be provided with a more resilient and thicker pad mounted in the space between the second element and the upper plate to ensure that, during the life time of the vehicle, the second element not be damaged by repeated elastic movements of the seat with an occupant thereon.

According to another aspect of the present invention, there is provided an energy absorbing device for reducing acceleration resulting from a force of high energy impact acting on one side of the device in an impact direction. The device comprises a first plate at the one side, a second plate at the other side, both plates being transverse to the impact direction, and an energy absorbing mechanism extending between the plates. The device further comprises a restriction mechanism connecting the two plates and adapted to restrict displacement of the first plate relative to the second plate at least in one direction different from the impact direction but allowing substantially free displacement of the first plate in the impact direction.

The restriction mechanism may be adapted to restrict the displacement in a direction perpendicular to the impact direction, or to restrict rotational displacement about an axis parallel to impact direction, or to restrict the displacement opposite to the impact direction, or preferably to restrict the displacement in any direction different from the impact direction.

In one embodiment, the restriction mechanism comprises mechanical links connecting the two plates of the device. The links are adapted to work substantially only in tension, such that they can resist either to shear loads applied to the first plate relative to the second plate, or to axial loads urging the two plates apart from one another, or to both such shear and axial loads, without resisting to loads urging the two plates towards one another. Such device for example may be used in a vehicle, the first plate being under the seat of an occupant of the vehicle and the second plate being attached to the floor of the vehicle.

The restriction mechanism preferably comprises a plurality of such links disposed in various diagonal directions such that the plurality of diagonal links can resist shear loads if applied in any direction. Some of the links may be orientated parallel to the impact direction.

Preferably, the links are pre-tensioned. More preferably, they are pre-tensioned such that shear loads exerted by the plurality of diagonal links on the two plates essentially balance each other.

The links may have pre-tensioning means such as a threaded nut and bolt pair. The links may be made of the following: flexible wire, twisted multi-wire cable, knitted cable, woven band, chain. Also the links may be at least partially thin rods or strips made integral with any one of the plates.

BRIEF DESCRIPTION OF THE DRAWINGS

In order to understand the invention and to see how it may be carried out in practice, two embodiments of the invention will now be described, by way of non-limiting examples only, with reference to the accompanying drawings, in which.

DETAILED DESCRIPTION OF THE DRAWINGS

Figure 1:
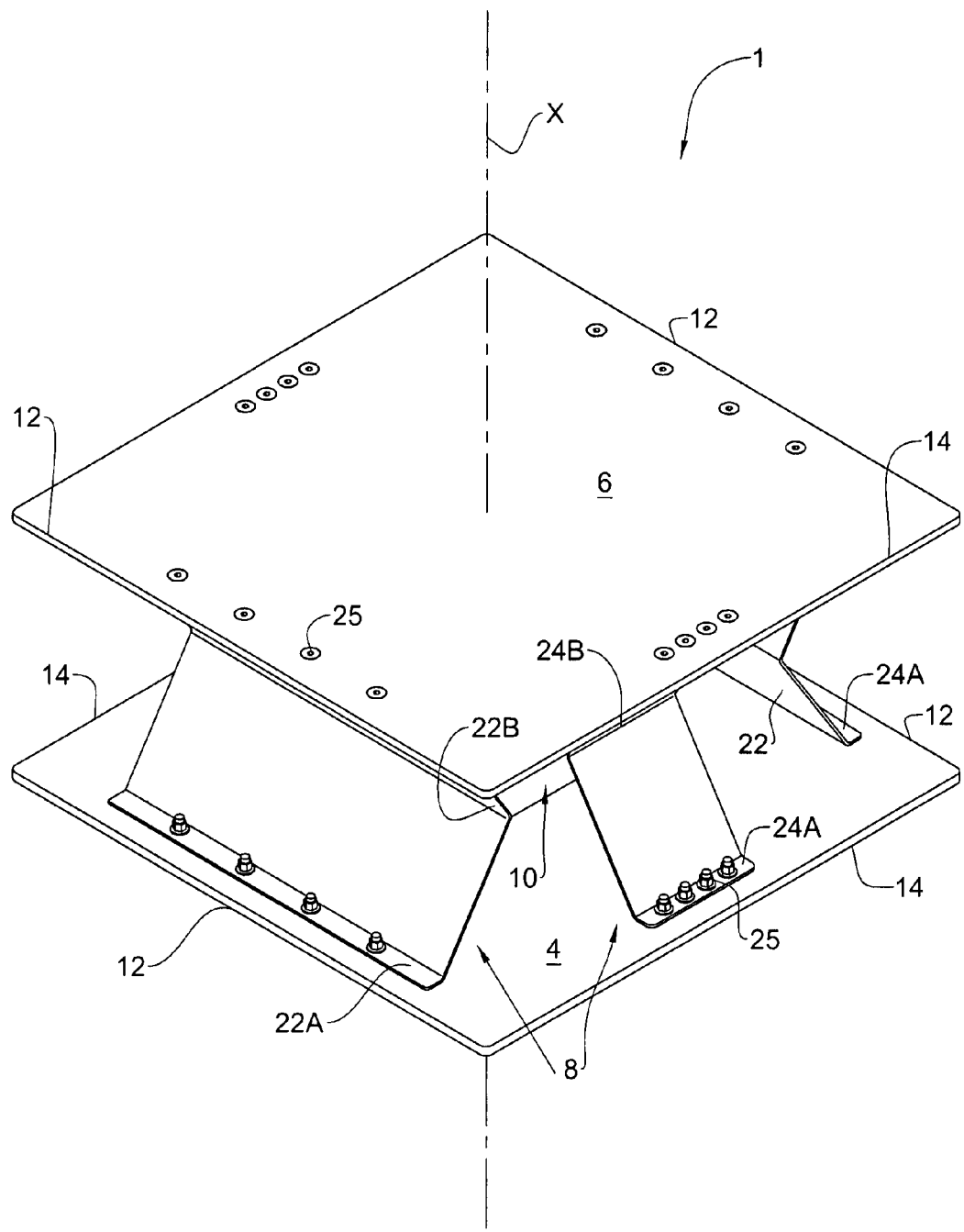
FIG. 1 is a perspective view of one example of an energy absorbing device designed according to the present invention.

With reference to FIG. 1, a device 1 is designed according to the present invention, for reducing acceleration transmitted to a seated occupant in a vehicle (not shown) as a result of a force of a high energy impact, such as a mine blast, acting thereon along an axis X of the device. The vehicle comprises a floor and a seat and the device 1 is adapted for being mounted therebetween. Consequently, the device's height H (see FIG. 3) equals the distance between the vehicle's floor and seat.

The device 1 comprises a lower plate 4, an upper plate 6, a first, peripherally located energy absorbing mechanism generally designated as 8, and a second, centrally located energy absorbing mechanism generally designated as 10. The lower plate 4 is adapted to be attached to the vehicle's floor, and the upper plate 6 is adapted to be attached to the vehicle's seat, by any means and in any manner known in the art. The upper and lower plates in the device 1 have each two pairs of opposite edges 12 and 14. Though the plates 4 and 6 are shown to have a square shape, their shape may be of any other configuration, regular or not, in accordance with the vehicle design.

The first energy absorbing mechanism 8 comprises a pair of peripheral legs 22 extending along the edges 12 of the upper and lower plates 4 and 6, and a pair of legs 24 (only one being seen in FIG. 1) extending along the edges 14 of the upper and lower plates. Each leg 22, 24 has lower end portion 22A, 24A, respectively, attached to the lower plate 4 adjacent its respective edges 12 and 14, and an upper end portion 22B, 24B, respectively, attached to the upper plate 6 adjacent its respective edges 12 and 14. The attachment may be performed by any appropriate attachment means such as screws or bolts 25.

The legs 22 and 24 are preferably made of metal such as, e.g. stainless steel or aluminum. The location of the legs may be different from that shown, in the drawings e.g. the legs may be associated with corners of the upper and lower plates, at which the edges 12 and 14 merge. Also, the number of legs does not have to be as shown, e.g. there may be no legs 24 or there may be more than two legs 22. However, an essentially even distribution of the legs around the axis X may be preferable to ensure stability of the seat in any direction perpendicular to the axis X.

Figure 2:
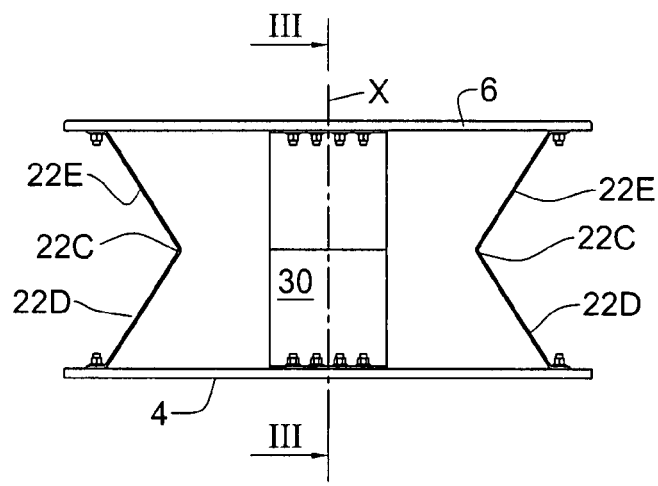
FIG. 2 is a side view of the device shown in FIG. 1.
Figure 3:
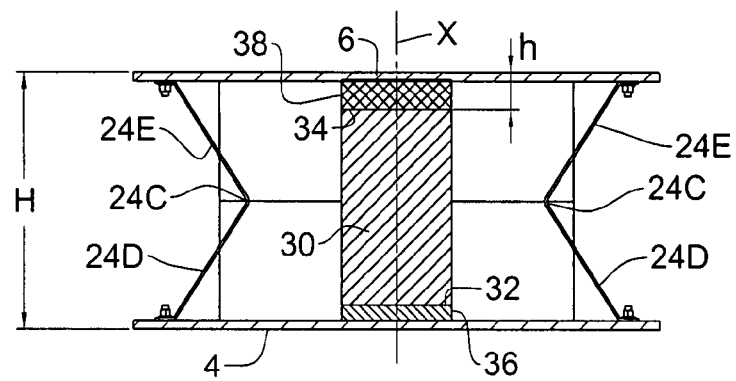
FIG. 3 is a cross-sectional view of the device shown in FIG. 1, taken along line III-III in FIG. 2.

As seen in FIGS. 2 and 3, the legs 22 and 24 are each in the form of a panel bent in the middle to form an angle α with an apex 22C, 24C between its lower part 22D, 24D disposed adjacent the lower plate 4 and its upper part 22E, 24E disposed adjacent the upper plate 6. The angle α exceeds 90° and it is preferably in the range between 100° and 140°. The fold of the legs 22 and 24 in the vicinity of their respective apexes 22C and 24C is rounded and it is adapted to function as a so-called 'plastic hinge' about which the plates may be first deformed elastically, to a predetermined extent $\Delta H_{elast}$ under a predetermined high impact force, and then plastically. It should be noted that the legs 22 and 24 may be bent in more than one location and that the 'plastic hinge' area does not necessarily need to be in the middle of the legs. Preferably, the apexes 22C and 24C are located at such a distance from the second energy absorption mechanism 10 as to ensure that when the legs 22 and 24 collapse to a maximal designed extent, the apexes 22C and 24C will not contact the second energy absorbing mechanism 10. The design of the legs 22 and 24 may differ from that of the legs.

Figure 4:
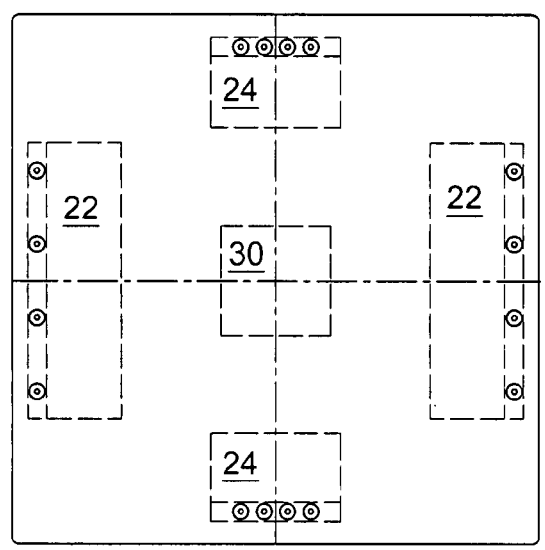
FIG. 4 is a schematic upper view of the device shown in FIG. 1.

As seen in FIG. 4, the legs 22 and 24 have different dimension in the direction along the edges 12 and 14 of the upper and lower plates 4 and 6. Namely, the legs 22 extend along the majority of the length of the upper and lower plates' edges 12, and the legs 24 extend along the minority of length of the edges 14 thereof. However, this difference is not necessary, and the legs may all have equal length, provided this length is shorter than the length of each of the edge 12 and 14.

The design of the peripheral legs 22 and 24 as well as their location in the device of the present invention should be chosen so as to ensure that the legs, on the one hand, are capable of required elastic deformation $\Delta H_{elast}$, under a high energy impact, and on the other hand, are strong enough to withstand, when in normal use during the life time of the vehicle, repeated loads exerted on the seat, while allowing a plurality of elastic movements of the seat which are essentially smaller than $\Delta H_{elast}$.

With reference to FIGS. 2, 3 and 4, the second energy absorbing mechanism 10 is in the form of a central leg 30 made of a material capable of progressive deformation. The material may be, for example, metal foam; a fiber reinforced composite structure, or the like. The central leg 30 has lower and upper ends 32 and 34, respectively, with the upper end 34 being spaced from the upper plate 6 to a distance h, which equals the designed extent $\Delta H_{elast}$ of elastic deformation of the legs 22 and 24. As shown, the leg 30 has a uniform square cross-sectional area. However, the cross-sectional shape of the leg 30 may be different, e.g. it may be rectangular, circular, or the like, and it may vary along the height of the leg.

The central leg 30 is provided with a relatively hard and thin resilient spacer 36 between the lower end 32 and the lower plate 4, and a relatively mild and thick resilient pad 38 between the upper end 34 and the upper plate 6.

When the device is mounted in a vehicle between its floor and seat, it serves as a support for the seat which, when in normal use, is capable of elastic movements along the axis X when an occupant is seated on the seat, the elastic movements being essentially smaller than $\Delta H_{elast}$. These movements are possible due to the specific design of the peripheral legs 22 and 24. The resilient pad 38 between the central leg 30 and the upper plate 6 protects the leg 30 from being damaged by these movements. When the vehicle is subjected to a high energy impact caused, for example, by a mine blast, the peripheral legs 22 and 24 will first undergo elastic deformation due to which the height of the device H will be reduced by $\Delta H_{elast}$, and then their plastic deformation will begin essentially simultaneously with progressive deformation of the central leg 30. The process of energy absorption will thereby be prolonged to reduce the acceleration transmitted to a seated occupant.

Several experiments were performed to verify that the above result is feasible with a device according to the present invention. One of the experiments was performed on a device having a design as described above, with the following parameters:

| Upper and lower plates: | |
| --- | --- |
| Size - | 330 × 330 mm |
| Thickness - | 5 mm |
| Material - | Aluminum 7075T6 |
| Distance between the plates - | 161.7 mm |
| Peripheral legs (legs 22 and 24 in FIGS. 1 to 4): | |
| Thickness - | 1.5 mm |
| Angle α - | 120° |
| Material - | Stanless Steel 304 |
| Central leg having four layers (leg 30 in FIGS. 1 to 4): | |
| Height - | |
| Total - | 136 mm |
| 1-st layer - | 25 mm |
| 2-nd, 3-d and 4-th layers, each - | 37 mm |
| Size - | 75 × 75 mm |
| Material - | Aluminum Foam |
| Spacer (spacer 36 in FIGS. 1 to 4): | |
| Thickness - | 5 mm |
| Material - | Rubber, NEWPHARM, 70 SHOR |
| Pad (pad 38 in FIGS. 1 to 4): | |
| Thickness - | 20 mm |
| Material - | Rubber foam, EPDM, 30 SHOR |

Figure 5:
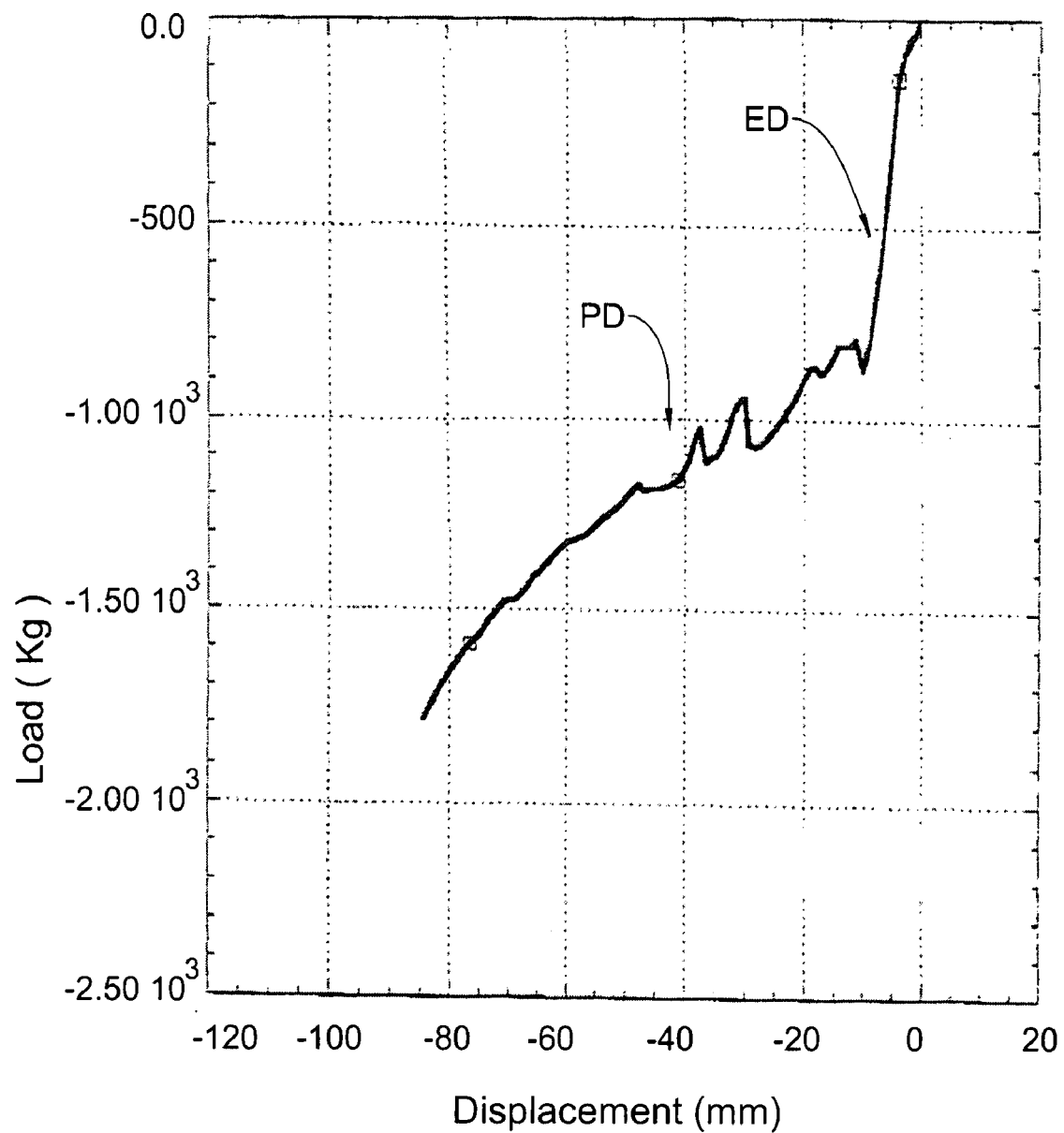
FIG. 5 is loading-displacement curve obtained in a compression test performed on a sample of a device according to the present invention.

The device with the above parameters was subjected to a compression test where compression load increasing up to about 2200 Kg during about 40 μsec was exerted on the device in the direction along its axis X. The loading-displacement curve obtained during the test is presented in FIG. 5, where section ED corresponds to the elastic deformation ($\Delta H_{elast}$) of about 10 mm of the peripheral legs and section PD corresponds to the simultaneous process of progressive compression of the central leg and plastic deformation of the peripheral legs.

The test results show that, within first 30 μsec, the tested device absorbs about 1800 Kg of force, and its height is reduced by 80 mm. This meets the requirement of maximum allowable acceleration of 18 g, which may be transmitted to a constrained seated occupant during first 30 μsec with a compression of the seat structure of up to 100 mm. The test results also show that the device does not undergo any non-elastic deformation under loads of up to 600-800 Kg, which means that it will be able to withstand, when necessary, some heavy off-road driving conditions.

In addition to the above test, a multiple compression test has been performed on the device under loads of up to 400 Kg, and it appeared to withstand such a load about 50,000 times while maintaining the required elasticity, which means that the device is suitable for prolonged use under normal driving conditions.

The above description refers to only one example of a device according to the present invention, and this example may clearly be modified within the scope of the invention, by introducing features known to skilled persons in the art.

While the device 1 of the present invention provides predetermined advantageous patterns of deformation under loads urging the plates 4 and 6 against each other, the strength and rigidity of the device under other operational loads may be insufficient. For example, the device 1 may be too "soft" (compliant) under shear loads parallel to the edges 14, or may become distorted under loads urging plates 4 and 6 apart from each other. The embodiment below provides enhanced rigidity of the device in selected desirable directions.

Figure 6:
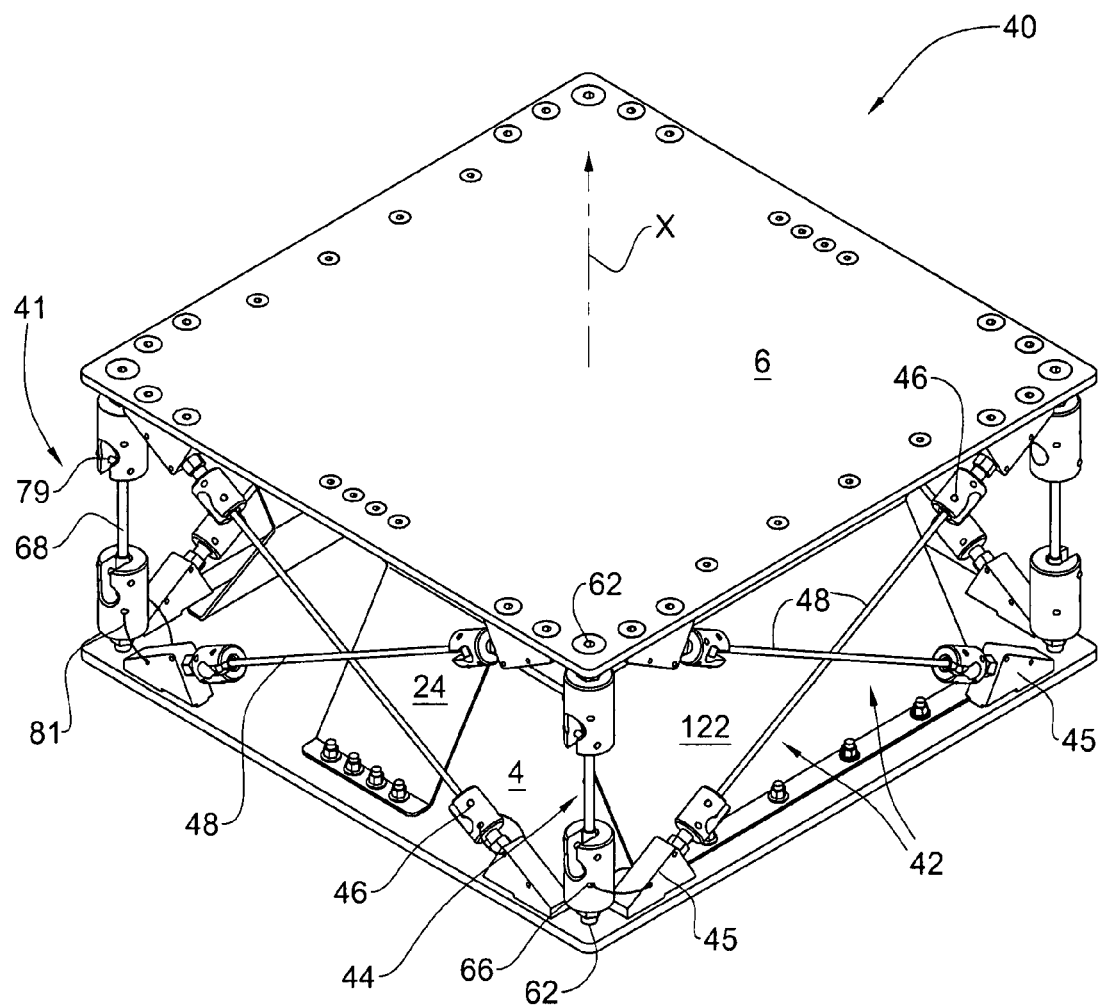
FIG. 6 is a perspective view of another example of an energy absorbing device, equipped with tension links.

With reference to FIG. 6, there is shown an energy absorbing device 40 similar to the device 1 of FIG. 1 but additionally equipped with a restriction mechanism 41 which comprises tension links of two types, diagonal link 42 and vertical link 44. Each tension link comprises two anchor elements, two tensioning elements and a tension cable which are slightly different in the two types of links.

Figures 7, 8:
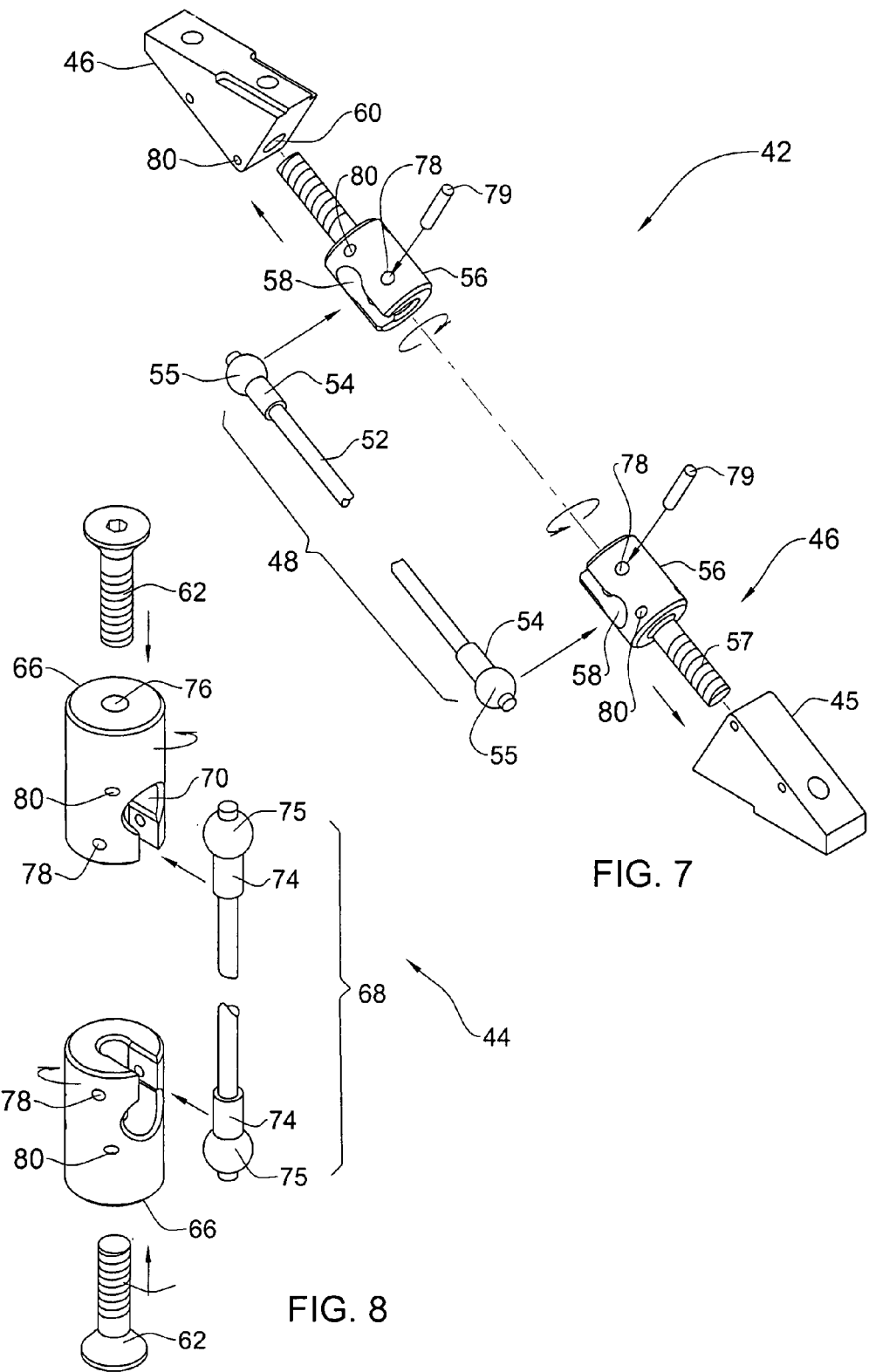
FIG. 7 is an exploded view of a diagonal tension link.
FIG. 8 is an exploded view of a vertical tension link.

With reference to FIG. 7, diagonal tension link 42 comprises two wedge-shaped boots (anchors) 45, two tensioning bolts 46 and a diagonal tension cable 48. Tension cable 48 comprises a length of twisted braided steel cable 52 and two cable thimbles 54 with ball-shaped heads 55 firmly fixed to the cable's ends. Tensioning bolts 46 have a cylinder socket 56 and a threaded tail 57. The socket 56 has a specially formed recess 58 with swollen bottom portion and lateral opening, such that a cable thimble 54 can be inserted therein laterally and captured securely when the cable 48 is pulled axially. The recess 58 however allows rotation of the thimble head 55. The boots 45 have threaded bores 60 matching the threaded tails 57, and are fixed by screws to each of the plates 4 and 6, close to plate corners.

With reference to FIG. 8, vertical tension link 44 comprises two anchor bolts 62, two tensioning nuts 66, and a vertical tension cable 68. The vertical tension cable 68, similarly to diagonal cable 48, comprises a length of twisted braided steel cable 72 and two cable thimbles 74 with ball-shaped heads 75 fixed to the cable's ends. Tensioning nuts 66 constitute cylinder sockets with a specially formed recess 70, similar to sockets 56 but adapted to accommodate thimbles 74. Tensioning nuts 66 have threaded bores 76 matching the anchor bolts 62. The latter are fixed by nuts in the corners of each of the plates 4 and 6.

Tensioning bolts 46, tensioning nuts 66, and wedge boots 45 have through off-center bores 78 for inserting locking pins 79 across the recess 58, and through bores 80 for inserting locking wire therein.

For assembly of the restriction mechanism 41, two tensioning bolts 46 are first slightly engaged in the threaded bores of two boots 45, one at the plate 4, the other at the plate 6, located approximately on a side diagonal of a parallelepiped defined by plates 4 and 6. Then thimbles 54 of one tension cable 48 are inserted in the recesses 58 of the tensioning bolts 46, and the tensioning bolts are further rotated to tighten the tension cable 48. Locking pins 79 are pressed into bores 78 to prevent thimbles 54 from disengaging. In this way, eight diagonal tension links 42 are assembled, two on each of the four lateral sides of the parallelepiped. Preferably, the tension links 42 are tightened uniformly, such that shear loads resulting from their tension are mutually balanced and do not affect other elements of the device.

In a similar way, two tensioning nuts 66 are screwed onto two opposing anchor bolts 62, thimbles 74 of the vertical tension cable 68 are engaged in the recesses 70, and the tensioning nuts 66 are further rotated to tighten the cable 68. Vertical tension links 44 are thus mounted along each lateral edge of the parallelepiped. The total load for pretension is about 100 to 200 Kg between the upper and the lower plates.

After adjusting the tension of the cable links 42 and 44, a piece of locking wire 81 is passed through each tensioning bolt 46 or nut 66 and an adjacent boot 45 and twisted in a ring so that accidental unscrewing of the tensioning elements is prevented.

The restriction mechanism 41 operates in the following way. In the case of shear loads parallel to the plates 4 and 6, or in the case of torque about the axis X, diagonal links 42 restrict the relative displacement of the plates and provide considerable rigidity and stability to the device 40.

In the case of loads urging the plates 4 and 6 apart from one another, opposite to the direction of a possible blast, vertical links 44 are loaded and restrict the relative displacement of the plates, again providing the desirable rigidity to the device 40. However, if the diagonal links are disposed under steeper angle to the plates, the restriction mechanism may be operable without such vertical links.

It will be appreciated that since the cable links 42 and 44 are flexible, they work only in tension and do not interfere with the deformation of the device 40 along the axis X, when plates 4 and 6 are forced against each other, i.e. in the case of a blast under the vehicle. Furthermore, the diagonal links 42 may be made of elongated rods or strips, even integral with the plates 4 or 6, as far as such rods tend to be very flexible and unstable under axial compression. Thus they would resist only negligibly to bending and compression and would work substantially only in tension.

The seat support (device) 40 provides an unusual and advantageous combination of mechanical properties under different loads:
  on one hand, moderate elastic deformation, high rigidity and strength under normal operational loads, including off-road travel of the vehicle; and
  on the other hand, plastic (crush) deformation of predetermined pattern under an impulsive load such as mine blast.

The tensioning restricting mechanism allows the energy absorbing device to be used in motor vehicles, such as trucks etc. which are normally operated under automotive standards and regulations concerning the seats behavior under normal service and crush caused by accidents on off-road terrain, etc.

Figure 9:
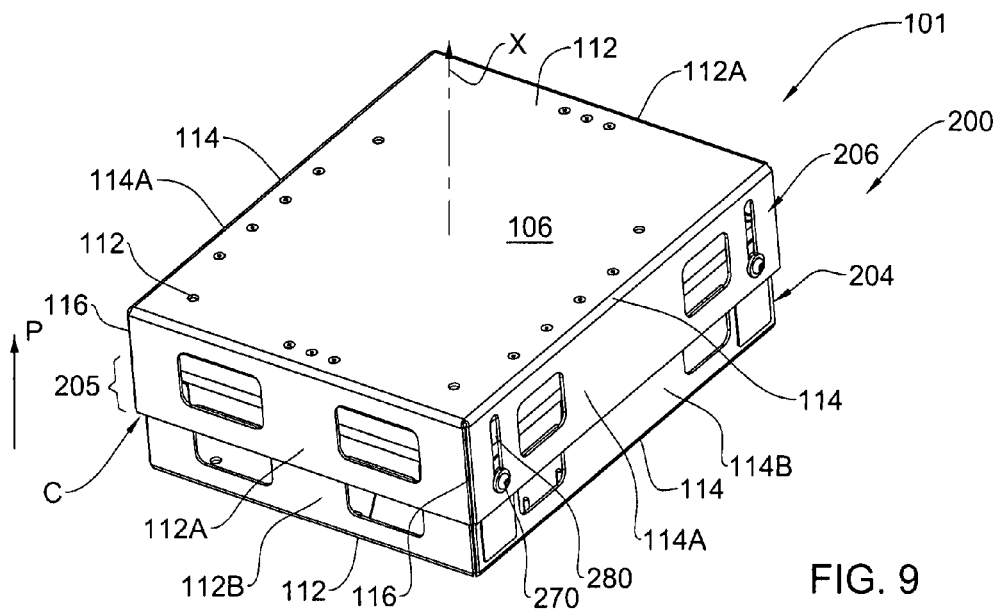
FIG. 9 is an isometric view of another example of an energy absorbing device, equipped with a stabilizing mechanism.
Figure 10:
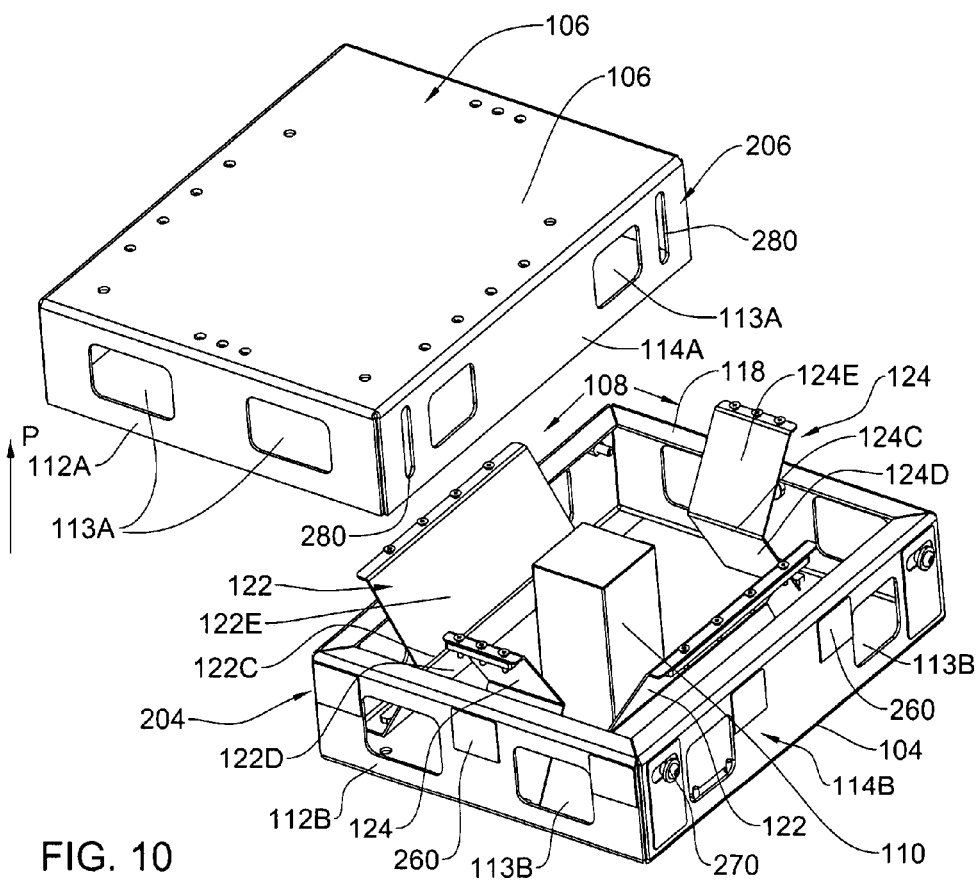
FIG. 10 is a partially exploded view of the embodiment of FIG. 9.

With reference to FIGS. 9 and 10, there is shown an energy absorbing device 101 similar to the device 1 of FIGS. 1 to 5 and comprises all the elements and features of the embodiments, mutatis mutandis, but is additionally equipped with a stabilizing mechanism 200 adapted to stabilize the upper and lower plates in directions other than the impact direction. The stabilizing mechanism 200 acts to limit relative movement of the upper and lower plates in directions other than the impact direction, and provides the device 101 with benefits over and above to those that may be obtained with the embodiment of FIGS. 6 to 8, mutatis mutandis.

Thus, the device 101 comprises a lower plate 104, an upper plate 106, a first, peripherally located energy absorbing mechanism 108, and a second, centrally located energy absorbing mechanism 110, similar to the corresponding components generally designated 4, 6, 8 and 10 described herein with reference to the embodiments of FIGS. 1 to 5, mutatis mutandis, for example. Thus, as with the other embodiments disclosed herein, the lower plate 104 is adapted to be attached to the vehicle's floor, and the upper plate 106 is adapted to be attached to the vehicle's seat, by any means and in any manner known in the art, and the upper and lower plates in the device 101 have each two pairs of opposite edges 112 and 114.

Similarly, the first energy absorbing mechanism 108 comprises a pair of peripheral legs 122 (each having a lower end portion 122A, upper end portion 122B, lower part 122D, upper part 122E, and apex 122C) extending along the edges 12 of the upper and lower plates 104 and 106, and a pair of legs 124 (each having a lower end portion 124A, upper end portion 124B, lower part 124D, upper part 124E, and apex 124C) extending along the edges 14 of the upper and lower plates, similar to the legs 22, 24 as described for the embodiment of FIGS. 1 to 5, for example, mutatis mutandis. Accordingly, and as before, the legs 122 and 124 are preferably made of metal such as, e.g. stainless steel or aluminum, and the location of the legs, the number thereof, and other features, alternative configurations, alternative arrangements and so on of the legs disclosed above regarding legs 22 and 24 also apply, mutatis mutandis, to legs 122 and 124 of this embodiment. Similarly, the second energy absorbing mechanism 110 is similar in form and function, and in all possible variations thereof, to the second energy absorbing mechanism 10 as described above for the embodiment of FIGS. 1 to 5, mutatis mutandis.

In contrast to the embodiment of FIGS. 1 to 5, in the embodiment of FIGS. 9 and 10, a stabilizing mechanism 200 is provided, comprising a first peripheral wall 206 comprised on the upper plate 106 and a second peripheral wall 204 comprised on the lower plate 104. As may be seen in FIG. 9 in particular, at least a part of the lower second peripheral wall 204 is nested within the upper first peripheral wall 206, in a substantially telescopic manner, and furthermore the second peripheral wall 204 is adapted for telescopically retracting within the upper first peripheral wall 206 in the impact direction, at least to an extent corresponding to the maximum travel between the lower plate 104 and upper plate 106 in the event of experiencing a high energy impact. Alternatively, a different arrangement may be provided, wherein the upper peripheral wall 206 is nested within the lower peripheral wall 204, mutatis mutandis. The overlapping portion 205 between the nested first and second peripheral walls 206, 204 is configured in a manner to restrict displacement of lower plate 104 relative to the upper plate 106 at least in one direction different from the impact direction P (parallel to axis X of the device) and to allow substantially free displacement of at least the lower plate 104 with respect to the upper plate 106 in said impact direction. In the illustrated embodiment, there is a small lateral clearance or spacing C between the inner-facing surface of the upper peripheral wall 206 and the outer-facing surface of the lower peripheral wall 204, and this substantially prevents relative displacement between the upper peripheral wall 206 and the lower peripheral wall 204 in directions having a component orthogonal to impact direction P. However, a friction-reducing or bearing material, such as for example TEFLON® strips, may be provided in the spacing C, on one or both facing parts of overlapping portion 205, to allow the lower peripheral wall 204 to slide relatively easily with respect to the upper peripheral wall when there is a high energy impact, enabling the two energy absorbing mechanisms to operate without hindrance therefrom.

The stabilizing mechanism 200 comprises a pair of open box like structures, each comprising the corresponding plate 104 or 106, and the corresponding peripheral wall 204 or 206, respectively.

In the embodiment illustrated in FIGS. 9 and 10, the upper peripheral wall 206 comprises two orthogonally arranged pairs of opposite side walls 112A and 114A, joined to one another at edges 116, and downwardly depending from the upper plate 106. Similarly, the lower peripheral wall 204 comprises two orthogonally arranged pairs of opposite side walls 112B and 114B, joined to one another at edges 114, and upwardly depending from the lower plate 104. Optionally, the upper edges of the walls 112B and 114B comprise an inner facing lip 118. The non-circular (in this case rectangular) cross-section of the peripheral walls 204, 206 substantially prevents relative rotation therebetween about the device axis X.

The side walls 112A and 114A, 112B and 114B may optionally comprise through-openings 113A, 113B, respectively, which may serve a number of purposes, including for example:

providing access to the interior of the device from an outside thereof without having to dismantle the device 101;

reducing overall weight of the device 101;

preventing or reducing resistance to relative movement between the upper and lower box-like structures of the stabilizing mechanism by allowing air to escape from inside the device rather than allowing the same to pressurize and thus dampen this movement if their only means of escape from the device is via the relative narrow gap or spacing C.

To further facilitate relative movement (i.e., to reduce resistance to movement) in the impact direction P between the two parts of the stabilizing mechanism 200, a plurality of strips or pads 260 comprising a suitable friction reducing material, for example TEFLON®, are optionally provided on at least one of the mutually facing surfaces of said upper peripheral wall 206 and the lower peripheral wall 204. Optionally, such friction reducing pads are provided on facing parts of both the upper peripheral wall 206 and the lower peripheral wall 204, such that these pads are in sliding contact with one another.

Particularly for cases where the impact direction may be offset from the axis X, the TEFLON® (or indeed any other friction reducing material) on both facing surfaces of said upper peripheral wall 206 and the lower peripheral wall 204 can be very useful in preventing seizing of the mechanism 200 due to impacting between the two walls. The friction reducing material can greatly assist in enabling the walls to effectively slide with respect one another when the device is subjected to offset impacts. In such cases, a feature of the device may be to manufacture the same with a closely-controlled tolerance spacing between the upper peripheral wall 206 and the lower peripheral wall 204, with the friction reducing material comprising two mutually slidable pads of tough wear resistant TEFLON® material.

The lower first peripheral wall may thus be substantially unconnected to the upper peripheral wall in any fixed manner when at least partially nested one in the other, and during operation thereof when subjected to an impact in direction P.

Nevertheless, and optionally, and referring to FIGS. 10 to 13, a shear pin arrangement 250 may be provided to act as an operational buffer, so that relative movement in the impact direction P between the two parts of the stabilizing mechanism 200, will be allowed only after a predetermined force F in this direction is encountered. For any force less than F, the shear pin arrangement substantially prevents relative movement, and thus the stabilizing mechanism, and indeed the energy absorbing device 101 behaves substantially as a substantially rigid box.

The shear pin arrangement 250 is located between any pair of facing walls of the stabilizing mechanism 200, for example walls 112A, 112B, which comprise aligned apertures 252A, 252B, respectively, sized to accommodate therein corresponding bushes 272A, 272B. The bushes 272A, 272B comprise aligned bores 274A, 274B, respectively, sized to accommodate therein shear pin 270, which comprises a head 276 at one end thereof, a threaded portion 277 at the other axial end thereof, and a central waisted section 278, adapted for shearing at a particular shearing force corresponding to the predetermined force F. A suitable nut 279 screws onto the threaded portion 277, locking the two parts 204, 206 of the stabilizing mechanism 200 via the pin 270 and bushes 272A, 272B. The pin shaft on either axial side of the waisted portion 278 and complementary bores 274A, 274B can be manufactured to a suitable tolerance, for example 0.05 mm, to prevent premature failing of the shear pin due to fatigue.

In some embodiments of the invention, it is desired to configure the pin 270 to suddenly shear at loads such that are beyond a particular range of off-road peak acceleration, but still less than a fatal acceleration consistent with an explosive event under the vehicle. Such off-road peak accelerations may be, for example about 9 g, 10 g or 11 g, and the maximum acceleration may be about 18 g, which is considered by some authorities as a fatal acceleration. An intermediate acceleration allowing a safety margin between peak accelerations due to driving conditions, and accelerations due to an explosive event, may be about 15 g.

In some particular embodiments, the shear pin arrangement 250 is configured such that the pin 270 suddenly shears when the force F exceeds about 1,100 Kg. This is consistent with shearing at 15.7 g with a driver/seat assembly weight of about 70 Kg (representing a nominal lower limit for driver weight), and with about 9.2 g with a driver/seat assembly of about 120 Kg (representing a nominal upper limit for driver weight). Depending on the expected driver weight, particularly if this can be controlled between closer limits than in the given example, and/or if the off-road acceleration peaks can be controlled (by virtue of restricting the vehicle to certain terrains only, for example) the pin 270 can be configured to shear at other shear loads, while maintaining an even greater safety margin for the accelerations.

Accordingly, it is possible to provide a shear pin arrangement 250 that will only shear, no matter what the driver weight is and the terrain (that is within preset limits) when an acceleration is experienced consistent with an explosive event or the like (for example some types of collision or crashes), while not shearing prematurely due to driving conditions, nor shearing only at too-high accelerations which may do little, by then, to help the driver.

The shear pin 270 may be made from a suitable substantially brittle material, for example having a relatively steep and high elastic stress/strain curve, with minimal non-plasticity characteristics. Accordingly, the pin 270 may maintain mechanical integrity until the design point (say, 1100 Kg), and then shear suddenly in a very short time period, substantially instantaneously, enabling the two parts 204, 206 of the stabilizing mechanism 200 to move towards each other along direction P, and thus protect the driver so that the high accelerations due to an explosive blast, which could otherwise prove fatal or injurious, are reduced with respect to the driver.

Figure 11:
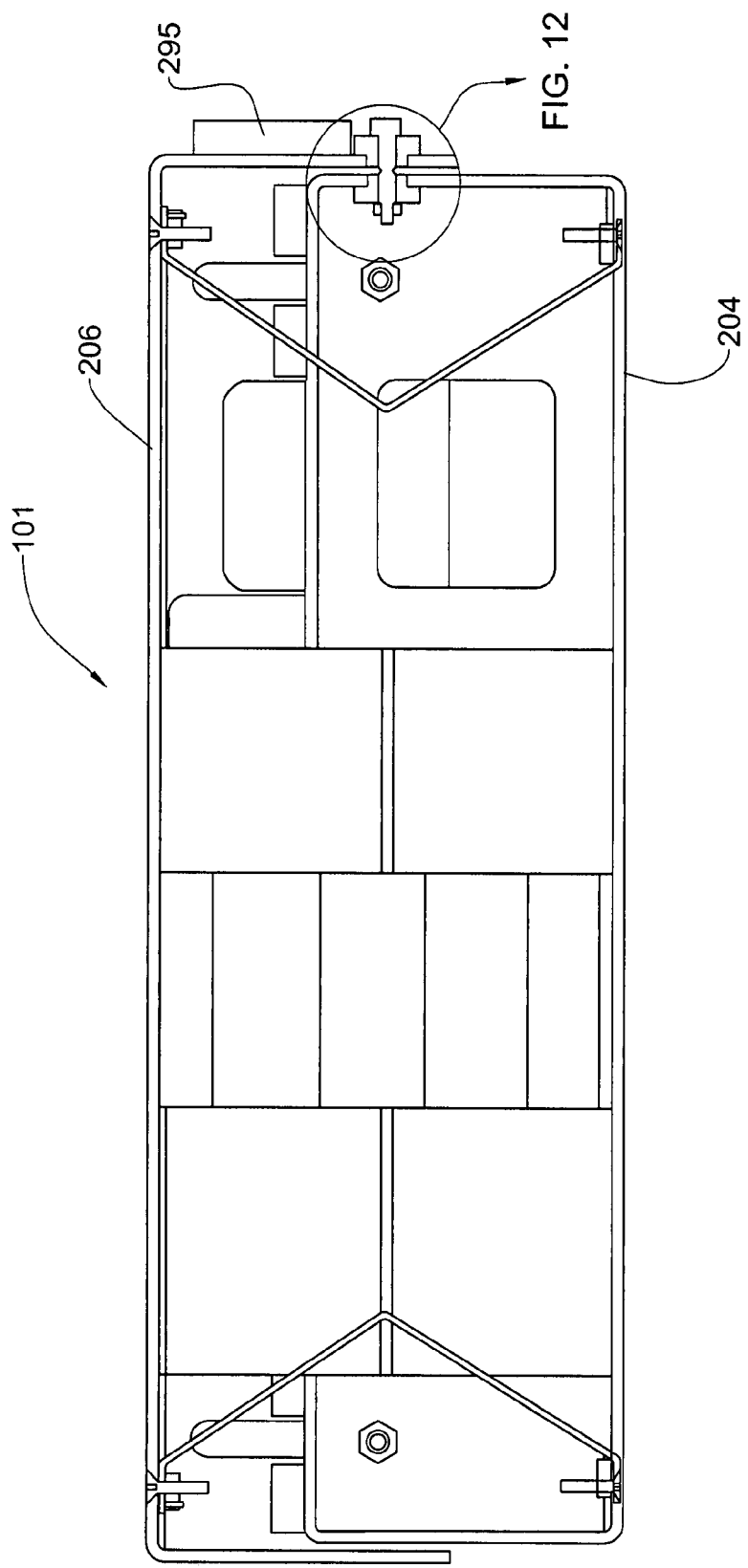
FIG. 11 is a cross-sectional side view of the embodiment of FIG. 9.
Figure 12:
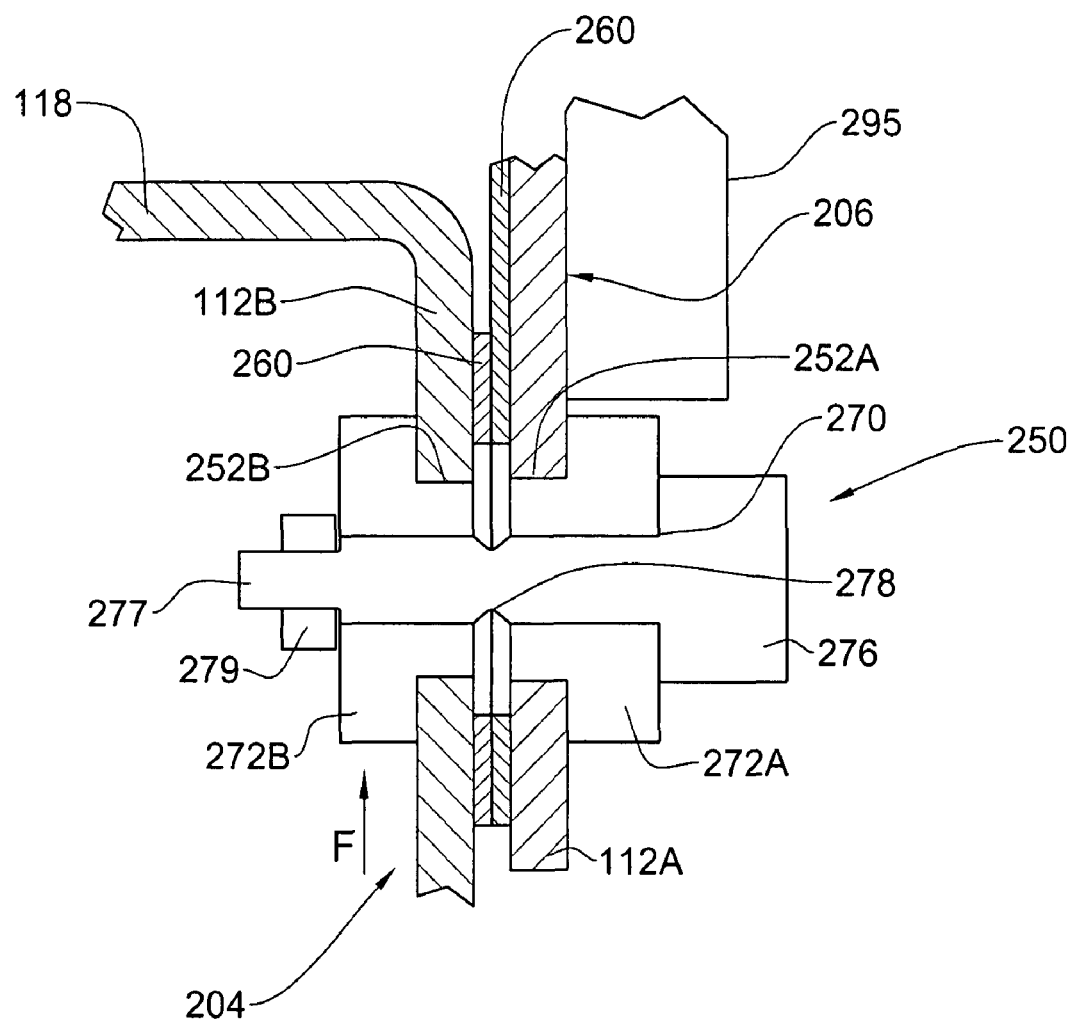
FIG. 12 is a detail view of part of FIG. 11.
Figure 13:
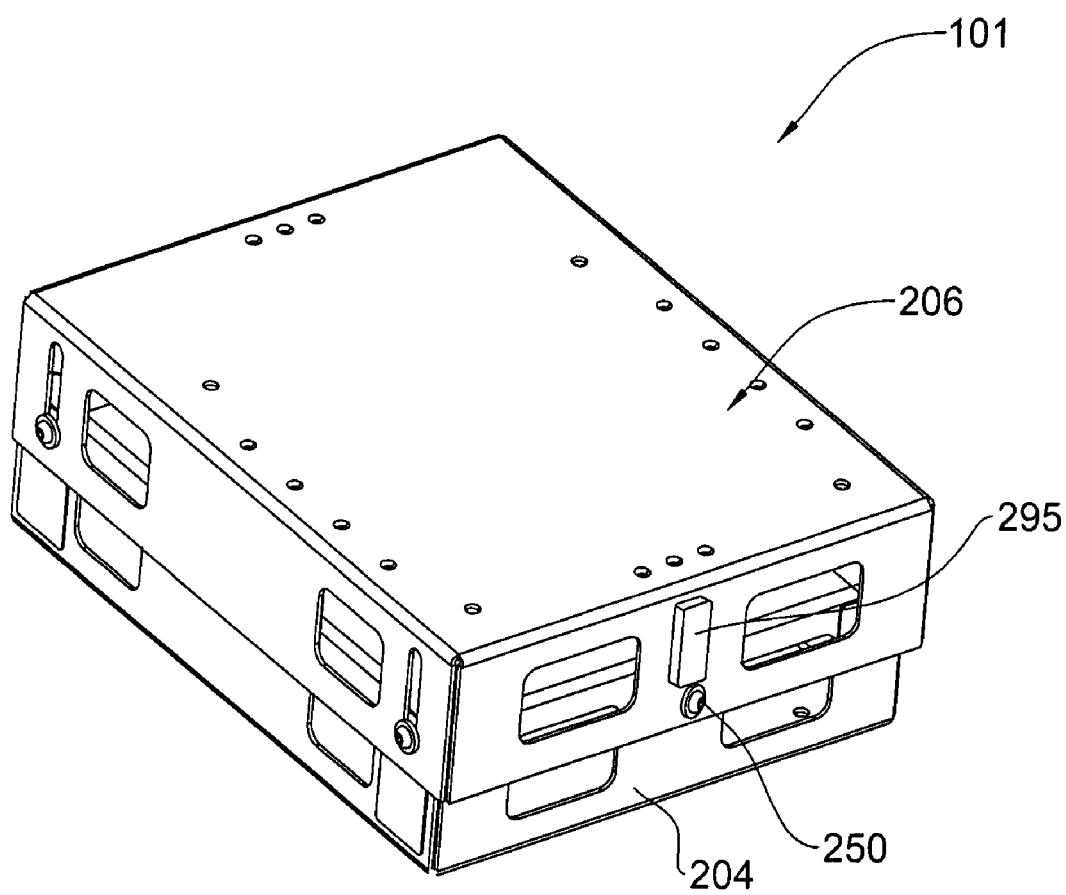
FIG. 13 is a different isometric view of the embodiment of FIG. 9.

Optionally, and as illustrated in FIGS. 11-13 a strengthening element or strengthener 295, such as a web, flange or other increase in material thickness, may be provided outwardly-facing on wall 112A aligned with direction P and above the shear pin arrangement 250, for example, for preventing the peripheral wall from bending or buckling due to forces exerted thereto via bushings 272A, 272B, due to driving conditions, explosive blast and so on.

Optionally, it may be desired to have the first energy absorbing mechanism 108 in a pre-stressed state, wherein the peripheral legs 122 and 124 are compressed to a small extent, rather than have the first energy absorbing mechanism 108 in a neutral or unstressed state prior to installation in the vehicle. In such a case, and to prevent the plates 104, 106 from distancing from one another, the stabilizing mechanism 200 is optionally configured for restricting displacement of the plates away from one another along axis X. In the illustrated embodiment, this is achieved by means of a stop arrangement which is adapted for limiting the minimum nesting overlap 205 between said upper peripheral wall 206 and the lower peripheral wall 204. The stop arrangement may be configured for substantially preventing relative movement between the upper plate 106 and the lower plate in a direction away from one another along the axis X beyond the initial assembled position. In the illustrated embodiment, the stop arrangement comprises a spaced plurality of pins 270, each pin 270 being joined to the lower peripheral wall, and passing through a corresponding slit 280 in registry therewith and formed in the upper peripheral wall 206, the slit 280 being substantially aligned along said impact direction to allow movement between the peripheral walls 204, 206 towards one another.

Though the box-like structures of the stabilizing mechanism 200 illustrated in FIGS. 9 and 10 are shown as having a generally parallelepiped shape, in particular a cuboid shape, their shape may be of any other configuration, regular or not, in accordance with the vehicle design. For example, the aforesaid structures may comprise a pair of telescopically engaged elliptical cylinders or prisms of any suitable cross-section, each having a facing open end.

In variations of this embodiment, rather than being joined to the plates 106, 104, the peripheral walls 206, 204 are comprised in separate box-like structures, similar to those described above, these structures being subsequently joined in any suitable manner to the plates 104, 106 in a nested manner. This variation of the embodiment of FIGS. 9 and 10 enables the embodiment of FIG. 1 to be retrofitted with such box-like structures to operate in a similar manner thereto. Also, in such cases the lower plate 104 and upper plate 106 may be respectively attached to the vehicle floor and seat in an indirect manner via the corresponding box-like structure.

As with the other embodiments, when the device is mounted in a vehicle between its floor and seat (either directly or indirectly), it serves as a support for the seat which, when in normal use, is capable of elastic movements along the axis X when an occupant is seated on the seat, the elastic movements being essentially smaller than $\Delta H_{elast}$. These movements are possible due to the specific design of the peripheral legs 122 and 124, and are not hindered by the presence of the peripheral walls 204, 206. The resilient pad between the central leg of second energy absorbing mechanism 110 and the upper plate 106 protects the central leg from being damaged by these movements. At the same time, any sideways movements, or other movements not in the impact direction P, are substantially restricted by the stabilizing mechanism 200, which serves to stabilize the device 101. When the vehicle is subjected to a high energy impact caused, for example, by a mine blast, the peripheral legs 122 and 124 will first undergo elastic deformation due to which the height of the device H will be reduced by $\Delta H_{elast}$, and then their plastic deformation will begin essentially simultaneously with progressive deformation of the central leg of the second energy absorbing mechanism 110. During this process, the lower peripheral wall 204 is slidingly and telescopically retracted into the upper peripheral wall 206. The process of energy absorption will thereby be prolonged to reduce the acceleration transmitted to a seated occupant to a level not exceeding an acceptable level of acceleration for a constrained seated occupant during predetermined amount of time.

The above description represents examples of stabilizing mechanism for a device according to the present invention, which may clearly be modified within the scope of the invention. For example, one or a plurality of first elements (e.g., pins, rods and so on) may be provided projecting from or otherwise depending from one of the plates and receivable in a telescopic or other nested manner into corresponding receiving elements comprised in the other plate, in a manner such as to substantially eliminate or at least reduce the possibility of movement in directions other than the impact direction, while allowing substantially unhindered movement in the impact direction. The arrangement allows a degree of freedom for translation along the impact direction while restricting freedom of movement in one or more degrees of freedom which are not aligned with the impact direction. Accordingly, the receiving elements may comprise an internal shape or configuration, for example substantially complementary to the external shape or configuration of the first elements, that allows the first elements to be received and to move therein with respect thereto in the impact direction, but diminishes the possibility of movement in other directions. For example, the receiving elements may comprise through-holes or wells of a particular diameter comprised in one of the plates, that allow the first elements to be inserted thereinto and move therein along the impact direction only. Alternatively, the disclosed examples may clearly be modified within the scope of the invention via other modifications known to skilled persons in the art. The stabilizing mechanism may be used with other types of energy-absorbing mechanisms.

Other aspects of the invention described herein are set out in the following Numbered Clauses:—

1. An energy absorbing device for reducing acceleration transmitted to a seated occupant in a vehicle as a result of a force of a high energy impact acting thereon in an impact direction, the device comprising a first energy absorbing mechanism having a first dimension in the impact direction and capable of undergoing elastic deformation of a predetermined amount in the impact direction; and a second energy absorbing mechanism having a second dimension in the impact direction, which is smaller than the first dimension to a distance corresponding to said amount of elastic deformation, thereby allowing the second mechanism to be loaded with said force after the first mechanism has undergone said elastic deformation, said second mechanism comprising a material capable of progressive deformation.

2. A device according to Numbered Clause 1, wherein the first mechanism is made of a material capable of undergoing plastic deformation simultaneously with said progressive deformation.

3. A device according to Numbered Clause 1 or 2, capable of reduction of the acceleration transmitted to a seated occupant of a vehicle to a level not exceeding 18 g for a constrained seated occupant during 30 μsec, with the deformation of the device in the impact direction not exceeding 100 mm.

4. A device according to Numbered Clause 1, 2 or 3, wherein the device comprises a lower plate to be attached to the floor of the vehicle, an upper plate to be attached to the seat, said first energy absorbing mechanism extending between the plates with its two ends attached to the plates, and the second energy absorbing mechanism attached to the lower plate with its one end and having the other end spaced from the upper plate to said distance corresponding to said amount of elastic deformation of the first element.

5. A device according to any one of Numbered Clauses 1 to 4, wherein the first mechanism is in the form of a plurality of peripherally located spaced apart first energy absorbing elements surrounding a centrally disposed second energy absorbing mechanism.

6. A device according to Numbered Clause 5, wherein the first energy absorbing elements are spaced from the second energy absorbing mechanism so that, when they are deformed, they do not contact the second mechanism.

7. A device according to any one of Numbered Clauses 1 to 6, wherein the first mechanism has special deformation area or areas, about which its deformation takes place.

8. A device according to any one of Numbered Clauses 1 to 7, wherein the second energy absorbing mechanism is in the form of at least one solid second energy absorbing element capable of progressive deformation.

9. A device according to Numbered Clause 8, wherein the second mechanism is at least partially made of metal foam.

10. A device according to Numbered Clause 9, wherein the metal foam is aluminum foam.

11. A device according to Numbered Clause 4, wherein said second energy absorbing mechanism is provided with a resilient spacer adapted to damp forces that may be exerted on the lower plate of the device.

12. A device according to any one of Numbered Clauses 1 to 11, wherein the second mechanism is provided with a resilient pad at an upper end of the mechanism, whose dimension in the impact direction equals said amount of elastic deformation.

13. An energy absorbing device for reducing acceleration transmitted to a seated occupant in a vehicle as a result of a force of a high energy impact acting thereon in an impact direction, the device comprising first peripherally disposed energy absorbing elements spaced apart from each other, having a first dimension in the impact direction and capable of undergoing elastic deformation of a predetermined amount in the impact direction; and a second centrally disposed energy absorption element having a second dimension in the impact direction, which is smaller than the first dimension to a distance corresponding to said amount of elastic deformation, thereby allowing the second element to be loaded with said force after the first elements have undergone said elastic deformation.

14. A seat structure comprising an energy absorbing device according to any one of Numbered Clauses 1 to 12.

15. A vehicle comprising a seat structure according to Numbered Clause 13.

16. A method of energy absorbing employed in an energy absorbing device according to Numbered Clause 1 or Numbered Clause 13.

17. An energy absorbing device substantially as described hereinbefore and/or shown in the accompanying drawings.

18. A method of energy absorbing substantially as described hereinbefore.

19. A method of energy absorbing for reducing acceleration transmitted to a seated occupant in a vehicle as a result of a force of a high-energy impact acting in impact direction, said method including:
providing a first energy absorbing mechanism having a first dimension in the impact direction and capable of undergoing a predetermined amount of elastic deformation in that direction;
providing a second energy absorbing mechanism having a second dimension in the impact direction, smaller that said first dimension by a distance corresponding to said amount of elastic deformation;
disposing the energy absorbing mechanisms in parallel with respect to occupant's seat thereby allowing the second mechanism to be loaded by said force after the first mechanism has undergone said amount of elastic deformation.

20. A method of energy absorbing according to Numbered Clause 19, wherein said second mechanism is capable of progressive deformation.

21. A method of energy absorbing according to Numbered Clause 20, wherein said first mechanism is capable of undergoing plastic deformation simultaneously with the progressive deformation of said second mechanism.

22. An energy absorbing device for reducing acceleration resulting from a force of a high energy impact acting on one side of said device in an impact direction, the device comprising a first plate at said one side, a second plate at the other side thereof, both plates being transverse to said impact direction, and an energy absorbing mechanism extending between the plates, wherein said device further comprises a restriction mechanism connecting said two plates, adapted to restrict displacement of said first plate relative to said second plate at least in one direction different from said impact direction and to allow substantially free displacement of said first plate in said impact direction.

23. A device according to Numbered Clause 22, wherein said restriction mechanism is adapted to restrict said displacement in a direction perpendicular to said impact direction.

24. A device according to Numbered Clause 22, wherein said restriction mechanism is adapted to restrict rotational displacement of said first plate about an axis parallel to said impact direction.

25. A device according to Numbered Clause 22, wherein said restriction mechanism is adapted to restrict said displacement opposite to said impact direction.

26. A device according to Numbered Clause 22, wherein said restriction mechanism is adapted to restrict said displacement in any direction different from said impact direction.

27. A device according to Numbered Clause 22, wherein said restriction mechanism comprises at least one mechanical link connecting said two plates, said at least one link being adapted to work substantially only in tension, such that said at least one link can restrict said displacement under either shear loads applied to the first plate relative to the second plate, or under axial loads urging the two plates apart from one another, or under both such shear and axial loads.

28. A device according to Numbered Clause 27, comprising a plurality of such links disposed in various diagonal directions such that said plurality of diagonal links can restrict said displacement under shear loads applied in any direction.

29. A device according to Numbered Clause 28, wherein said plurality of links are pre-tensioned.

30. A device according to Numbered Clause 29, wherein said plurality of diagonal links are pre-tensioned such that shear loads exerted by said plurality of diagonal links on the two plates essentially balance each other.

31. A device according to Numbered Clause 27, comprising a plurality of such links disposed in the impact direction.

32. A device according to Numbered Clause 27, wherein said at least one link has pre-tensioning means.

33. A device according to Numbered Clause 32, wherein said pre-tensioning means is a threaded nut and bolt pair.

34. A device according to Numbered Clause 27, wherein said at least one link includes one of the following: flexible wire, twisted multi-wire cable, knitted cable, woven band, chain.

35. A device according to Numbered Clause 27, wherein said at least one link is at least partially a thin rod or strip integral with one of the two plates.

36. A device according to Numbered Clause 22, wherein said device is adapted for use in a vehicle, the first plate being under the seat of an occupant of the vehicle and the second plate being attached to the floor of the vehicle.

The invention claimed is:

1. An energy absorbing device for reducing acceleration resulting from a force of a high energy impact acting on one side of said device in an impact direction, the device comprising a first plate at said one side, a second plate at the other side thereof, both plates being transverse to said impact direction, and an energy absorbing mechanism extending between the plates, wherein
said device further comprises a stabilizing mechanism comprising at least one pair of a projecting element and a receiving element, wherein said first plate comprises one of said projecting element and said receiving element of said pair, and wherein said second plate comprises the other one of said projecting element and said receiving element of said pair, wherein the or each said pair is configured for enabling the projecting element thereof to be at least partially received by the corresponding said receiving element in a manner to restrict relative displacement between said first plate and said second plate at least in one direction different from said impact direction and to allow substantially free displacement of said first plate relative to said second plate in said impact direction,
wherein for the or each said pair, the respective projecting element is received in the respective receiving element and moves therein in said impact direction, while diminishing the possibility of movement in other directions,
wherein said at least one pair of a projecting element and a receiving element comprises a first peripheral wall and a second peripheral wall comprised on said first plate and said second plate, respectively, one of said first or second peripheral wall configured for being at least partially nested within the other one of said first or second peripheral wall in a manner to restrict displacement of said first plate relative to said second plate at least in one direction different from said impact direction and to allow substantially free relative displacement in said impact direction, and
wherein at least one of said first peripheral wall and said second peripheral wall comprises at least one through hole.

2. The energy absorbing device according to claim 1, wherein said first and second peripheral walls depend from peripheral edges of said first and second plates, respectively, in directions toward the other said first and second plates, respectively.

3. The energy absorbing device according to claim 1, wherein at least one said first peripheral wall and said second peripheral wall depends from the respective said first and second plates, respectively, to form an open box structure.

4. The energy absorbing device according to claim 1, wherein said first peripheral wall and said second peripheral wall are separated from one another at least in one direction different from said impact direction by a substantially continuous spacing.

5. The energy absorbing device according to claim 4, wherein a suitable friction reducing material is provided in said spacing to reduce resistance to mutual movement between said first and second peripheral walls parallel to said impact direction.

6. The energy absorbing device according to claim 1, wherein said friction reducing material comprises TEFLON® (polytetrafluoroethylene).

7. The energy absorbing device according to claim 1, wherein said at least one of said first peripheral wall and said second peripheral wall comprises one or a plurality of slits extending to a free end of corresponding said first peripheral wall or said second peripheral wall.

8. The energy absorbing device according to claim 1, further comprising a suitable friction reducing material on at least one mutually facing surface of said first peripheral wall or said second peripheral wall to reduce resistance to movement between said first and second peripheral walls along said impact direction.

9. The energy absorbing device according to claim 1, wherein said first peripheral wall and said second peripheral wall each have a form corresponding to an open parallelepiped when joined to said first plate and second plate, respectively.

10. The energy absorbing device according to claim 1, wherein said first peripheral wall and said second peripheral wall each have a form corresponding to an open cuboid when joined to said first plate and second plate, respectively.

11. The energy absorbing device according to claim 1, wherein said first peripheral wall is substantially unconnected to said second peripheral wall when at least partially nested one in the other.

12. The energy absorbing device according to claim 1, wherein said stabilizing mechanism is configured to restrict said displacement opposite to said impact direction, and wherein optionally said device comprises a stop arrangement to limit minimum nesting overlap between said first peripheral wall and said second peripheral wall.

13. The energy absorbing device according to claim 12, wherein said stop arrangement is configured for substantially preventing relative movement between said first plate and said second plate in a direction away from one another.

14. The energy absorbing device according to claim 12, wherein said stop arrangement comprises a spaced plurality of pins, each pin joined to one of said first peripheral wall and said second peripheral wall and passing through a slit formed in the other one of said first peripheral wall and said second peripheral wall, wherein said slit is substantially aligned along said impact direction.

15. The energy absorbing device according to claim 1, wherein said stabilizing mechanism is configured to restrict said displacement in a direction perpendicular to said impact direction.

16. The energy absorbing device according to claim 1, wherein said stabilizing mechanism is configured to restrict rotational displacement of said first plate about an axis parallel to said impact direction.

17. The energy absorbing device according to claim 1, wherein said stabilizing mechanism is configured to restrict said displacement in any direction different from said impact direction.

18. The energy absorbing device according to claim 1, wherein said device is configured for use in a vehicle, the first plate being under the seat of an occupant of the vehicle and the second plate being directly or indirectly attached to the floor of the vehicle.

19. The energy absorbing device according to claim 1, wherein said energy absorbing mechanism comprises a first energy absorbing mechanism having a first dimension in the impact direction and capable of undergoing elastic deformation of a predetermined amount in the impact direction; and a second energy absorbing mechanism having a second dimension in the impact direction, which is smaller than the first dimension to a distance corresponding to said amount of elastic deformation, thereby allowing the second mechanism to be loaded with said force after the first mechanism has undergone said elastic deformation, said second mechanism comprising a material capable of progressive deformation.

20. The energy absorbing device according to claim 19, wherein the first mechanism is made of a material capable of undergoing plastic deformation simultaneously with said progressive deformation.

21. The energy absorbing device according to claim 19, capable of reduction of the acceleration transmitted to a seated occupant of a vehicle to a level not exceeding 18 g for a constrained seated occupant during 30 μsec, with the deformation of the device in the impact direction not exceeding 100 mm.

22. The energy absorbing device according to claim 19, wherein said first plate is configured to be attached directly or indirectly to a floor of a vehicle, said second plate is configured to be attached directly or indirectly to a vehicle seat, said first energy absorbing mechanism extending between the first and second plates with its two ends attached to the plates, and the second energy absorbing mechanism attached to the first plate with its one end and having the other end spaced from the first plate to said distance corresponding to said amount of elastic deformation of the first element.

23. The energy absorbing device according to claim 19, wherein the first mechanism is in the form of a plurality of peripherally located spaced apart first energy absorbing elements surrounding a centrally disposed second energy absorbing mechanism, and wherein optionally the first energy absorbing elements are spaced from the second energy absorbing mechanism so that, when they are deformed, they do not contact the second mechanism.

24. The energy absorbing device according to claim 19, wherein the first mechanism has special deformation area or areas, about which its deformation takes place.

25. The energy absorbing device according to claim 19, wherein the second energy absorbing mechanism is in the form of at least one solid second energy absorbing element capable of progressive deformation, wherein optionally the second mechanism is at least partially made of metal foam, and wherein optionally the metal foam is aluminum foam.

26. The energy absorbing device according to claim 22, wherein said second energy absorbing mechanism is provided with a resilient spacer configured to damp forces that may be exerted on the first plate of the device.

27. The energy absorbing device according to claim 19, wherein the second mechanism is provided with a resilient pad at an upper end of the mechanism, whose dimension in the impact direction equals said amount of elastic deformation.

28. The energy absorbing device according to claim 1, wherein said energy absorbing mechanism comprises first peripherally disposed energy absorbing elements spaced apart from each other, having a first dimension in the impact direction and capable of undergoing elastic deformation of a predetermined amount in the impact direction; and a second centrally disposed energy absorption element having a second dimension in the impact direction, which is smaller than the first dimension to a distance corresponding to said amount of elastic deformation, thereby allowing the second element to be loaded with said force after the first elements have undergone said elastic deformation.

29. The energy absorbing device according to claim 1, further comprising a shear pin arrangement for substantially immobilizing the stabilizing mechanism when subjected to a force in said impact direction less than a predetermined force.

30. The energy absorbing device according to claim 29, wherein said predetermined force is substantially less than that provided by an explosive device rated for the device and wherein optionally said predetermined force is substantially more than that induced by predetermined driving conditions.

31. A seat structure comprising an energy absorbing device according to claim 1.

32. A vehicle comprising a seat structure according to claim 31.

33. A method of energy absorbing employed in an energy absorbing device according to claim 18.

34. A method of energy absorbing employed in an energy absorbing device according to claim 27.

35. The energy absorbing device according to claim 1, wherein said first peripheral wall depends from the respective said first plate to form an open box structure, and wherein said second peripheral wall depends from the respective said second plates to form another open box structure.

36. The energy absorbing device according to claim 1, wherein said first peripheral wall has a first height dimension less than a first width dimension of said first plate, and wherein said second peripheral wall has a second height dimension less than a second width dimension of said second plate.

37. An energy absorbing device for reducing acceleration resulting from a force of a high energy impact acting on one side of said device in an impact direction, the device comprising a first plate at said one side, a second plate at the other side thereof, both plates being transverse to said impact direction, and an energy absorbing mechanism extending between the plates, wherein said device further comprises a stabilizing mechanism comprising at least one pair of a projecting element and a receiving element, wherein said first plate comprises one of said projecting element and said receiving element of said pair, and wherein said second plate comprises the other one of said projecting element and said receiving element of said pair, wherein the or each said pair is configured for enabling the projecting element thereof to be at least partially received by the corresponding said receiving element in a manner to restrict relative displacement between said first plate and said second plate at least in one direction different from said impact direction and to allow substantially free displacement of said first plate relative to said second plate in said impact direction, wherein for the or each said pair, the respective projecting element is received in the respective receiving element and moves therein in said impact direction, while diminishing the possibility of movement in other directions, wherein said at least one pair of a projecting element and a receiving element comprises a first peripheral wall and a second peripheral wall comprised on said first plate and said second plate, respectively, one of said first or second peripheral wall configured for being at least partially nested within the other one of said first or second peripheral wall in a manner to restrict displacement of said first plate relative to said second plate at least in one direction different from said impact direction and to allow substantially free relative displacement in said impact direction, and wherein said first peripheral wall depends from the respective said first plate to form an open box structure, and wherein said second peripheral wall depends from the respective said second plates to form another open box structure.

38. The energy absorbing device according to claim 37, wherein said first peripheral wall and said second peripheral wall each have a form corresponding to an open parallelepiped when joined to said first plate and second plate, respectively.

39. The energy absorbing device according to claim 37, wherein said first peripheral wall and said second peripheral wall each have a form corresponding to an open cuboid when joined to said first plate and second plate, respectively.

40. The energy absorbing device according to claim 37, wherein said energy absorbing mechanism comprises a first energy absorbing mechanism having a first dimension in the impact direction and capable of undergoing elastic deformation of a predetermined amount in the impact direction; and a second energy absorbing mechanism having a second dimension in the impact direction, which is smaller than the first dimension to a distance corresponding to said amount of elastic deformation, thereby allowing the second mechanism to be loaded with said force after the first mechanism has undergone said elastic deformation, said second mechanism comprising a material capable of progressive deformation.

41. The energy absorbing device according to claim 40, wherein said first plate is configured to be attached directly or indirectly to a floor of a vehicle, said second plate is configured to be attached directly or indirectly to a vehicle seat, said first energy absorbing mechanism extending between the first and second plates with its two ends attached to the plates, and the second energy absorbing mechanism attached to the first plate with its one end and having the other end spaced from the first plate to said distance corresponding to said amount of elastic deformation of the first element.

42. The energy absorbing device according to claim 37, wherein said energy absorbing mechanism comprises first peripherally disposed energy absorbing elements spaced apart from each other, having a first dimension in the impact direction and capable of undergoing elastic deformation of a predetermined amount in the impact direction; and a second centrally disposed energy absorption element having a second dimension in the impact direction, which is smaller than the first dimension to a distance corresponding to said amount of elastic deformation, thereby allowing the second element to be loaded with said force after the first elements have undergone said elastic deformation.

43. An energy absorbing device for reducing acceleration resulting from a force of a high energy impact acting on one side of said device in an impact direction, the device comprising a first plate at said one side, a second plate at the other side thereof, both plates being transverse to said impact direction, and an energy absorbing mechanism extending between the plates, wherein said device further comprises a stabilizing mechanism comprising at least one pair of a projecting element and a receiving element, wherein said first plate comprises one of said projecting element and said receiving element of said pair, and wherein said second plate comprises the other one of said projecting element and said receiving element of said pair, wherein the or each said pair is configured for enabling the projecting element thereof to be at least partially received by the corresponding said receiving element in a manner to restrict relative displacement between said first plate and said second plate at least in one direction different from said impact direction and to allow substantially free displacement of said first plate relative to said second plate in said impact direction, of said first plate relative to said second plate in said impact direction, wherein for the or each said pair, the respective projecting element is received in the respective receiving element and moves therein in said impact direction, while diminishing the possibility of movement in other directions, wherein said at least one pair of a projecting element and a receiving element comprises a first peripheral wall and a second peripheral wall comprised on said first plate and said second plate, respectively, one of said first or second peripheral wall configured for being at least partially nested within the other one of said first or second peripheral wall in a manner to restrict displacement of said first plate relative to said second plate at least in one direction different from said impact direction and to allow substantially free relative displacement in said impact direction, and wherein said stabilizing mechanism is configured to restrict rotational movement of said first plate about an axis parallel to said impact direction.

44. The energy absorbing device according to claim 43, wherein said first peripheral wall and said second peripheral wall have non-circular cross-sections.

45. The energy absorbing device according to claim 43, wherein said first peripheral wall and said second peripheral wall have rectangular cross-sections.

46. The energy absorbing device according to claim 43, wherein said energy absorbing mechanism comprises a first energy absorbing mechanism having a first dimension in the impact direction and capable of undergoing elastic deformation of a predetermined amount in the impact direction; and a second energy absorbing mechanism having a second dimension in the impact direction, which is smaller than the first dimension to a distance corresponding to said amount of elastic deformation, thereby allowing the second mechanism to be loaded with said force after the first mechanism has undergone said elastic deformation, said second mechanism comprising a material capable of progressive deformation.

47. The energy absorbing device according to claim 46, wherein said first plate is configured to be attached directly or indirectly to a floor of a vehicle, said second plate is configured to be attached directly or indirectly to a vehicle seat, said first energy absorbing mechanism extending between the first and second plates with its two ends attached to the plates, and the second energy absorbing mechanism attached to the first plate with its one end and having the other end spaced from the first plate to said distance corresponding to said amount of elastic deformation of the first element.

48. The energy absorbing device according to claim 43, wherein said energy absorbing mechanism comprises first peripherally disposed energy absorbing elements spaced apart from each other, having a first dimension in the impact direction and capable of undergoing elastic deformation of a predetermined amount in the impact direction; and a second centrally disposed energy absorption element having a second dimension in the impact direction, which is smaller than the first dimension to a distance corresponding to said amount of elastic deformation, thereby allowing the second element to be loaded with said force after the first elements have undergone said elastic deformation.

49. An energy absorbing device for reducing acceleration resulting from a force of a high energy impact acting on one side of said device in an impact direction, the device comprising a first plate at said one side, a second plate at the other side thereof, both plates being transverse to said impact direction, and an energy absorbing mechanism extending between the plates, wherein
 said device further comprises a stabilizing mechanism comprising at least one pair of a projecting element and a receiving element, wherein said first plate comprises one of said projecting element and said receiving element of said pair, and wherein said second plate comprises the other one of said projecting element and said receiving element of said pair, wherein the or each said pair is configured for enabling the projecting element thereof to be at least partially received by the corresponding said receiving element in a manner to restrict relative displacement between said first plate and said second plate at least in one direction different from said impact direction and to allow substantially free displacement of said first plate relative to said second plate in said impact direction,
 wherein for the or each said pair, the respective projecting element is received in the respective receiving element and moves therein in said impact direction, while diminishing the possibility of movement in other directions,
 wherein said at least one pair of a projecting element and a receiving element comprises a first peripheral wall and a second peripheral wall comprised on said first plate and said second plate, respectively, one of said first or second peripheral wall configured for being at least partially nested within the other one of said first or second peripheral wall in a manner to restrict displacement of said first plate relative to said second plate at least in one direction different from said impact direction and to allow substantially free relative displacement in said impact direction, and
 wherein said first peripheral wall has a first height dimension in said impact direction less than a first width dimension of said first plate in a direction orthogonal to the impact direction, and wherein said second peripheral wall has a second height dimension in said impact direction less than a second width dimension of said second plate in a direction orthogonal to the impact direction.

50. The energy absorbing device according to claim 49, wherein said energy absorbing mechanism comprises a first energy absorbing mechanism having a first dimension in the impact direction and capable of undergoing elastic deformation of a predetermined amount in the impact direction; and a second energy absorbing mechanism having a second dimension in the impact direction, which is smaller than the first dimension to a distance corresponding to said amount of elastic deformation, thereby allowing the second mechanism to be loaded with said force after the first mechanism has undergone said elastic deformation, said second mechanism comprising a material capable of progressive deformation.

51. The energy absorbing device according to claim 50, wherein said first plate is configured to be attached directly or indirectly to a floor of a vehicle, said second plate is configured to be attached directly or indirectly to a vehicle seat, said first energy absorbing mechanism extending between the first and second plates with its two ends attached to the plates, and the second energy absorbing mechanism attached to the first plate with its one end and having the other end spaced from the first plate to said distance corresponding to said amount of elastic deformation of the first element.

52. The energy absorbing device according to claim 49 wherein said energy absorbing mechanism comprises first peripherally disposed energy absorbing elements spaced apart from each other, having a first dimension in the impact direction and capable of undergoing elastic deformation of a predetermined amount in the impact direction; and a second centrally disposed energy absorption element having a second dimension in the impact direction, which is smaller than the first dimension to a distance corresponding to said amount of elastic deformation, thereby allowing the second element to be loaded with said force after the first elements have undergone said elastic deformation.

\* \* \* \* \*